United States Patent [19]
Yamada et al.

[11] 3,964,016
[45] June 15, 1976

[54] RECORDING SYSTEM FOR VEHICLE OCCUPANT PROTECTING APPARATUS

[75] Inventors: Takashi Yamada, Anjo; Kazuo Oishi, Oobu; Toshiaki Kato, Nishio; Kazuo Iwase, Okazaki, all of Japan

[73] Assignee: Nippon Soken, Inc., Nishio, Japan

[22] Filed: Mar. 14, 1974

[21] Appl. No.: 451,293

[30] Foreign Application Priority Data
Mar. 16, 1973 Japan................................ 48-31101

[52] U.S. Cl.......................... 340/52 H; 180/103 A; 200/61.45 M; 280/753
[51] Int. Cl.² ........................................ B60R 21/08
[58] Field of Search.................. 340/27, 52 R, 52 H, 340/61, 262; 235/150.2; 180/91, 103 A; 280/150 AB; 200/61.45 M, 61.53

[56] References Cited
UNITED STATES PATENTS
3,461,429 8/1969 Gray .................. 235/150.2
3,714,627 1/1973 Dillman et al. .................. 340/52 H

*Primary Examiner*—John W. Caldwell
*Assistant Examiner*—Joseph E. Nowicki
*Attorney, Agent, or Firm*—Cushman, Darby & Cushman

[57] ABSTRACT

A recording system for a vehicle occupant protecting apparatus wherein operating conditions of the various components of the occupant protecting apparatus are recorded, when the occupant protecting apparatus such as an air bag properly comes into operation, when conditions are detected which require the operation of the occupant protecting apparatus although its actual operation does not take place or when any fault occurs in the occupant protecting apparatus, thereby to know the various conditions and circumstances which existed during the collision or under the fault condition.

9 Claims, 5 Drawing Figures

RECORDING SYSTEM FOR VEHICLE OCCUPANT PROTECTING APPARATUS

BACKGROUND OF THE INVENTION

1. Field of the Invention

The present invention relates to a recording system used in association with an occupant protecting apparatus such as an air bag apparatus, seat belt apparatus or rear-end collision preventing apparatus installed in a vehicle, particularly an automobile thereby to record the strength of impact or the performance of the occupant protecting apparatus during a collision.

2. Description of the Prior Art

With a conventional vehicle occupant protecting apparatus, e.g., an air bag apparatus, it has been difficult to know, after such an emergency situation occurs as the occupant protecting apparatus should operate promptly, whether the occupant protecting apparatus operated properly, or it was operated erroneously or it failed to operate, and further it has been difficult to know the cause of the erroneous operation when the apparatus was operated erroneously. Therefore, in a lawsuit instituted for decision whether the responsibility for such erroneous operation or failure to operate lay on the manufacturer or the user, it has been difficult to make the decision, and moreover it has been difficult to devise effective countermeasures for the erroneous operations which took place.

SUMMARY OF THE INVENTION

With a view to overcoming the foregoing difficulty, it is an object of the present invention to provide a recording system for vehicle occupant protecting apparatus wherein when the occupant protecting apparatus operates, when conditions are detected which require the operation of the apparatus although it does not actually operate or when any fault occurs in the apparatus, the operating conditions of the components of the occupant protecting apparatus, such as, the output of the collision sensor, the presence of a break in the ignition coil and the distance travelled by the vehicle are recorded so that the various conditions which existed during the collision or under fault condition may be confirmed thus making it possible to make an analysis of the collision at a later time, and moreover the distance travelled by the vehicle after the occurrence of the fault may be easily determined.

The recording system according to this invention has among its remarkable advantages the fact that the system comprises a diagnostic circuit whereby at least when a collision sensor detects the collision of a vehicle and produces a collision signal so that an ignition circuit for actuating an occupant protecting apparatus is operated to produce a signal, when the collision sensor becomes faulty and produces a collision sensor signal or when the ignition circuit becomes faulty and produces a fault signal, at least one of these signals is received to produce a signal representative of the fact that the ignition circuit has been operated, the collision sensor has become faulty or the ignition circuit has become faulty; and a recording unit for receiving the output signal of the diagnostic circuit and recording various signals representative of the driving conditions of the vehicle existing at the time of the generation of the output signal from the diagnostic circuit, thereby providing valuable data useful for the analysis of the collision at a later time.

Another remarkable advantage of the system of this invention is the use of a recording unit which, upon generation of the output signal of the diagnostic circuit, records the output signal of the collision sensor and the output signal of an odometer. Thus when the vehicle occupant protecting apparatus fails to operate upon collision of the vehicle, it is possible to determine whether the failure of the occupant protecting apparatus to operate was due to the fault of the ignition circuit or the fault of the collision sensor that took place prior to the collision of the vehicle and thereby to know the cause of the failure of the vehicle occupant protecting apparatus to operate.

Still another remarkable advantage of the system of this invention is the use of a warning device, wherein when the diagnostic circuit generates a signal upon the failure of either the collision sensor or the ignition circuit, this signal actuates the warning device to give an indication of the fault thereby eliminating the danger of encountering a collision without knowing the presence of the fault in the occupant protecting apparatus.

DESCRIPTION OF THE PREFERRED EMBODIMENT

The present invention will now be described with reference to the illustrated embodiment.

Figure 1:
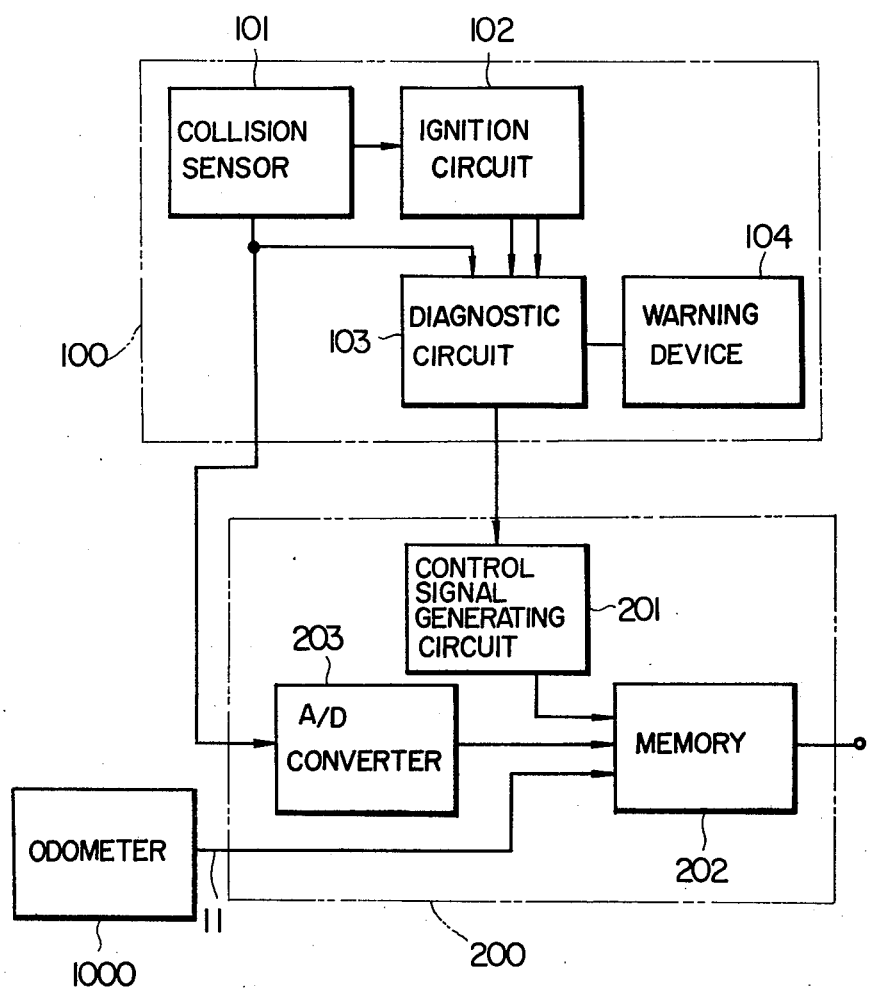
FIG. 1 is a block diagram showing the general construction of an embodiment of a recording system according to the present invention.

Referring first to FIG. 1 showing a block diagram of an embodiment, numeral 101 designates a collision sensor attached to the front part of a vehicle, e.g., the bumper to detect the deceleration due to a collision. Numeral 102 designates an ignition circuit for an occupant protecting apparatus, e.g., an air bag apparatus which receives the output signal of the collision sensor 101, and when this output signal is a signal generated by a collision greater than a predetermined value, the occupant protecting apparatus operates to lessen the shock of a collision between the occupants and the instrument panel, for example. Numeral 103 designates a diagnostic circuit for detecting the fault condition of the collision sensor 101 and the ignition circuit 102 and the operation of the ignition circuit 102. Numeral 104 designates a warning device for receiving the output signal of the diagnostic circuit 103, and when the diagnostic circuit 103 detects the presence of a fault condition, e.g., the breakage of a coil 332 of the collision sensor 101 or the breakage of a filament 115 of the ignition circuit 102 shown in FIG. 2, the warning device gives warning to the occupants, Numeral 1000 designates an odometer for generating an output signal representing the integration of the distance travelled by the vehicle.

Numeral 200 designates in block form a recording unit in which numeral 201 designates a control signal generating circuit for receiving the output signal of the diagnostic circuit 103, wherein when the presence of a fault condition is detected by the diagnostic circuit 103 or when the ignition circuit 102 is operated, a control signal is generated to bring the recording unit 200 into operation. Numeral 203 designates an A/D converter for receiving the output voltage waveform of the collision sensor 101 to convert it into a digital value and, 202 represents a memory for receiving the output signal of the control signal generating circuit 201 and storing the output signals of the A/D converter 203 and the odometer 1000.

Figure 2:
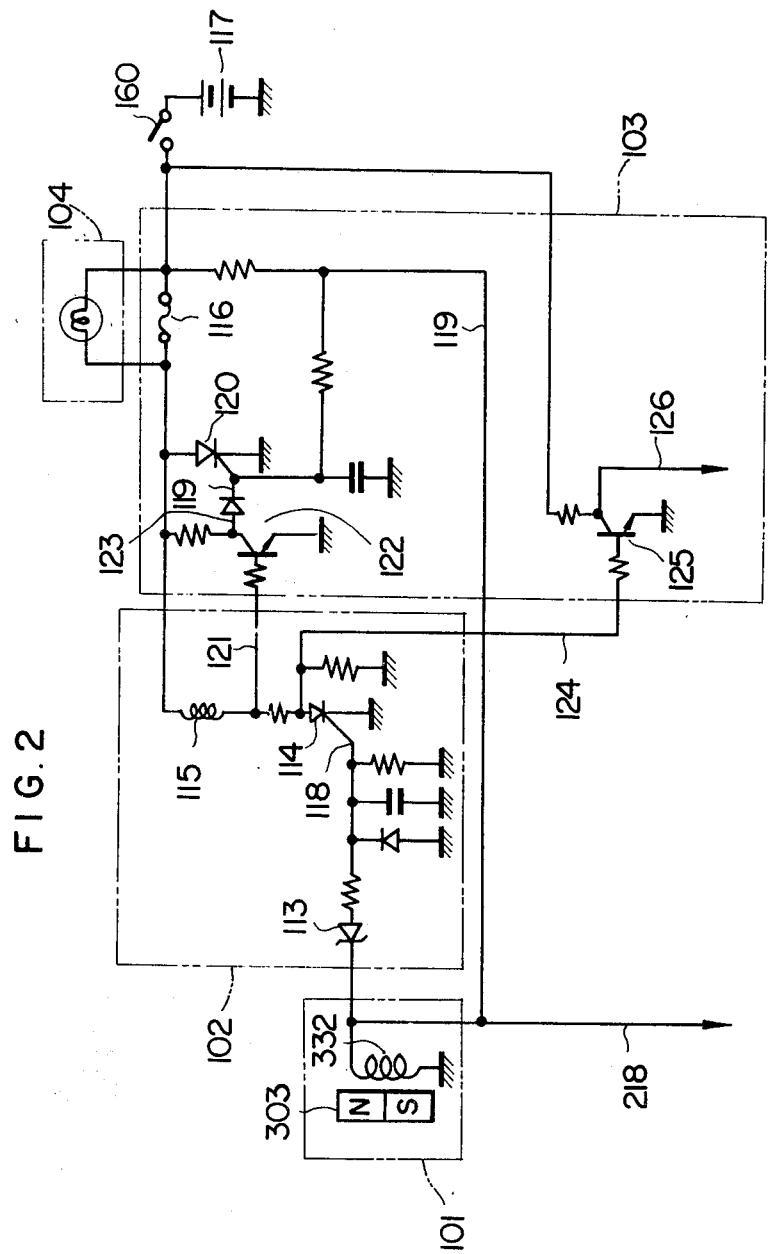
FIG. 2 is a detail circuit diagram of the block 100 in the embodiment of FIG. 1.

Referring now to FIG. 2 showing a detail circuit diagram of the block 100 comprising the collision sensor 101, the ignition circuit 102, the diagnostic circuit 103 and the warning device 104, the collision sensor 101 is shown comprising a generator attached to the bumper of the vehicle and adapted to generate a voltage in response to the relative movement of the vehicle and the bumper due to a collision of the vehicle. Numeral 303 designates a permanent magnet movable in response to a relative deformation of the vehicle body due to a collision, and numeral 332 designates a coil. The ignition circuit 102 takes advantage of the fact that the output voltage of the collision sensor 101 is substantially proportional to the relative speed of the vehicle toward an obstacle during collision, whereby when the output voltage of the collision sensor 101 is higher than a predetermined value, i.e., when a collision occurs at a speed higher than a predetermined value, current is supplied to a filament 115 for setting off an explosive that actuates an occupant protecting apparatus, e.g., an air bag apparatus. And numeral 113 designates a Zener diode, 114 a rectifier element with a control electrode (hereinafter referred to as an SCR), 115 the filament for setting off an explosive. The diagnostic circuit 103 is provided to detect the breakage of the coil 332 and the filament 115, and numeral 116 designates a fuse. Numeral 160 designates a key switch. In this embodiment, the warning device 104 comprises a lamp. Numeral 117 designates a battery.

Figure 3:
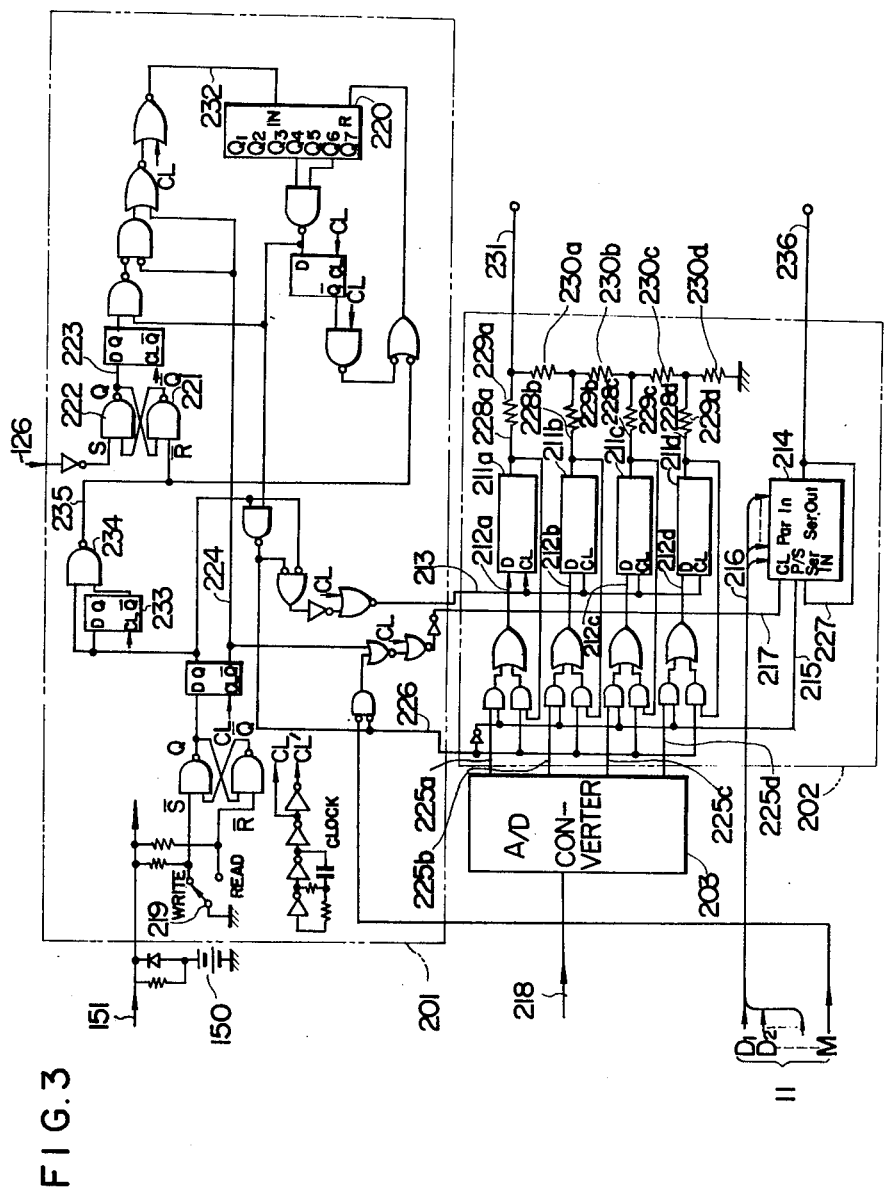
FIG. 3 is a detail circuit diagram of the block 200 in the embodiment of FIG. 1.

Referring now to FIG. 3 showing in detail the construction of the recording unit 200, the memory 202 comprises a semiconductor integrated circuit memory in which numerals 211*a*, 211*b*, 211*c* and 211*d* designate shift registers which may for example be 36-stage shift registers, RCA CD4006 and in which input signals 212*a*, 212*b*, 212*c* and 212*d* are respectively shifted one place to the right at the instant when each applied clock pulse signal 213 falls. Numeral 214 designates a shift register which may for example be the RCA 8-stage static shift register, IC CD4014, whereby a parallel/serial control signal 215 is at a 1 level, a parallel input signal 216 is recorded at the instant when a clock pulse 217 rises. When the parallel/serial control signal 215 is at the 0 level, a serial input signal 227 is recorded at the instant when the clock pulse 217 rises. The A/D converter 203 converts a signal 218 into a digital value and it may for example be selected from the Teledyne A/D Converter Series.

In the control signal generating circuit 201, numeral 219 designates an operating switch which selects either the writing mode of the memory 202 or the reading mode thereof, 220 a counter which may for example be the RCA IC CD4024. The purpose of the counter 220 is to count up to 36, i.e., the number of the stages in the registers 211*a*, 211*b*, 211*c* and 211*d*, respectively. And other logic elements may also be selected from the RCA C-MOS IC Series. Numeral 150 designates a battery for supplying voltage to the component elements in the recording unit 200 when an external power supply 151 is disconnected. The battery 150 comprises a nickel cadmium storage battery contained in the recording unit 200 and it is normally being charged gradually.

Figure 4:
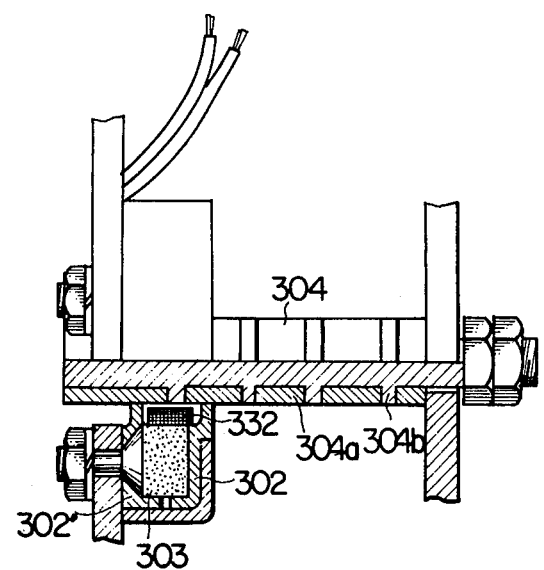
FIG. 4 is a partial sectional view of the collision sensor used in the embodiment of FIG. 1.

Referring now to FIG. 4 showing an exemplary construction of the collision sensor 101, numeral 332 designates a coil, 302 and 302' iron pieces forming a magnetic path, 303 a permanent magnet, 304 a shaft in bar form which comprises an iron core 304*b* irregular in section, and a non-magnetic material 304*a* filled in the notched portions of the iron core 304*b*. The collision sensor 101 is attached for example to a vehicle between the bumper and the body portion so that the deformation of the bumper during a collision displaces the shaft 304.

Figure 5:
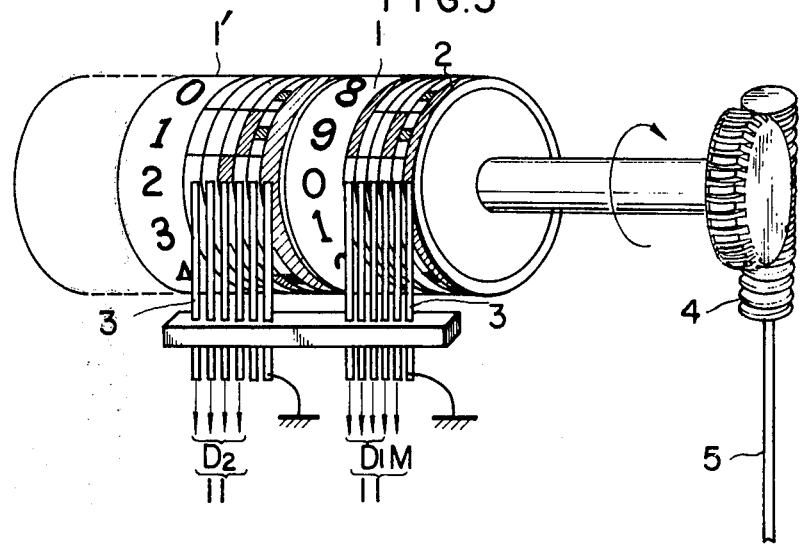
FIG. 5 is a perspective view showing the construction of the odometer used in the embodiment of FIG. 1.

In FIG. 5 showing an exemplary method of digitalizing the value of the odometer 1000 for storage in the memory 202, numeral 1 designates a drum which indicates the first place figure of the indicated mileage and which is printed with a metallic foil 2 having patterns consisting of conductive and nonconductive portions formed to correspond to binary-coded decimal numbers. Numeral 1' designates a drum which indicates the second place figure and which is printed with the similar metallic foil 2 as the drum 1, 3 designates contactors for sliding over the metallic foils 2, 4 a gear, 5 a cable for transmitting the rotation of the wheel, 11 lines for receiving signals from the contactors 3 which are connected to the recording unit 200.

With the construction described above, the recording system for vehicle occupant protecting apparatus according to this invention operates as follows. When the vehicle collides with anything, the coil 332 produce a voltage approximately proportional to the speed of the collision. When this voltage is higher than the Zener voltage of the Zener diode 113, current flows to a gate 118 of the SCR 114 to turn the SCR 114 on. This causes a flow of current to the filament 115 with the result that an explosive (not shown) is set off and thus the occupant protecting apparatus is actuated to reduce the shock to which the occupants are subjected. In this case, if there is a break in the coil 332, the potential of signal line 119 rises to turn an SCR 120 on and thus the fuse 116 melts to light the warning lamp 104 to warn the occupants of the occurrence of the fault. When this occurs, owing to the melting of the fuse 116, the flow of current to the ignition circuit 102 is practically stopped to bring it out of operation. On the other hand, when the filament 115 breaks, the potential of signal line 121 drops to turn transistor 122 off. Consequently, the potential of signal line 123 rises and thus the SCR 120 is turned on with the result that the warning lamp 104 goes on and the fuse 116 melts in the similar manner when the coil 332 breaks. In this way, when there is a fault condition with the breakage of the coil 332 or the filament 115 or when the ignition circuit 102 comes into operation to turn the SCR 114 on, the potential of signal line 124 drops so that a transistor 125 is turned off and the potential of signal line 126 rises. When the potential of signal line 126 rises, a flip-flop circuit comprising NAND elements 221 and 222 changes its state and signal line 223 goes to the 1 level. In this case, if the operating switch 219 is in the writing position, signal line 224 goes to the 0 level and clock pulse signals are generated in a line 232. Consequently, the counter 220 comes into operation to count the clock pulses. On the other hand, the signal on line 218 from the collision sensor 101 is converted into a digital signal by the A/D converter 203 producing signals on lines 225a, 225b, 225c and 225d. Since, in this writing mode, a signal line 226 remains at the 0 level until the counter 220 counts up to 36, the signals on lines 225a, 225b, 225c and 225d are respectively applied to the input terminals 212a, 212b, 212c and 212d of the shift registers 211a, 211b, 211c and 211d. Further, since the signal 226 is at the 0 level, clock pulse signals appear on the line 213. Consequently, the output signal 218 of the collision sensor 101 is stored in the shift registers 211a, 211b, 211c and 211d. Since each of the shift registers 211a, 211b, 211c and 211d comprises 36 flip-flop stages, the signals shifted to the right of the 36th stage are shifted out or lost and therefore the latest 36 signals are retained. When the counter 220 has counted to 36, the clock signal line 213 goes to the 0 level and the signal line 226 goes to the 1 level stopping the writing operation. Thus, the shift registers 211a, 211b, 211c and 211d retain the information recorded during the time required for the counter 220 to count up to 36 after the trigger signal was applied. On the other hand, since, in the writing mode, the signal line 226 remains at the 0 level until the counter 220 counts to 36, when the output signal of the odometer 1000 appearing on the signal lines 11 indicates that a signal M is at the 0 level, i.e., signals $D_1$, $D_2$, ..., represent the significant values, clock pulse signals are applied to a clock input line 217 of the shift register 214. Further, since, in the writing mode, the parallel/serial control line 215 is at the 1 level to select the parallel mode of operation, the parallel input signal 216 to the shift register 214, i.e., the signals $D_1$, $D_2$, ..., representing the distance of run indicated by the odometer 1000 are recorded. The signals $D_1$, $D_2$, ..., represent in binary-coded decimal form the integrated distance of run indicated by the odometer 1000 and therefore four signal lines are necessary for each figure of the indicated mileage. Thus, if the odometer 1000 indicates distance of run by a number of six figures, then the signals $D_1$, $D_2$, ..., require a total of 24 signal lines.

When the content of the recorded information is to be read out after the occurrence of a collision or fault, the operating switch 219 is shifted to the reading position. As a result, the signal at line 224 goes to the 1 level and now clock pulse signals appear on the lines 213 and 217. On the other hand, since the signal line 226 is at the 1 level, the output signals on lines 228a, 228b, 228c and 228d from the shift registers 211a, 211b, 211c and 211d appear respectively at the input lines 212a, 212b, 212c and 212d of the shift registers 211a to 211d. Consequently, the signal recorded in the shift registers 211a, 211b, 211c and 211d are circularly shifted to the right in synchronism with the fall of the clock signals 213.

As a result, the signals recorded in the shift registers 211a, 211b, 211c and 211d appear periodically at the output lines 228a, 228b, 228c and 228d in groups corresponding to the number of the stages in the respective shift registers 211a, 211b, 211c and 211d. The output signals 228a, 228b, 228c and 228d are then converted into an analog signal by a ladder type A/D converter network comprising resistors 229a, 229b, 229c and 229d and resistors 230a, 230b, 230c and 230d. The analog output voltage appears at an output terminal 231. In this way, this output signal at line 231 is a reproduction of the output voltage generated from the collision sensor 101 during a predetermined time interval dependent on 36 clock pulse periods upon the actuation of the ignition circuit 102 or the occurrence of a fault condition. In the reading mode, the mileage information recorded in the shift register 214 may be read out from an output terminal 236 in a similar manner. In other words, since, in the reading mode, the signal line 224 is at the 1 level, clock pulses are applied to the input terminal of the shift register 214. And also since the parallel/serial control signal 215 is at the 0 level the output signal 236 applied to the serial input terminal 227 is again recorded in the shift register 214. Namely, in the reading mode, the mileage signal recorded in the shift register 214 is circulated to the right in synchronism with the rise of the clock pulse signals 217. Thus, the recorded mileage signal is repeatedly produced periodically at the output terminal 236. A flip-flop element 233 and a NAND element 234 are provided so that when the operating switch 219 is placed in the writing position, a reset pulse signal is produced in a line 235, and this reset pulse signal resets the flip-flop circuit comprising the NAND elements 221 and 222 and the counter 220 and places them in condition for writing operation.

Further, even the external power supply 151 is disconnected, the component elements in the recording unit 200 are internally supplied with a voltage and thus the recorded information will not be lost.

The collision sensor 101 shown in FIG. 4 operates as follows. When a collision occurs, the permanent magnet 303 is held stationary and the shaft 304 is moved to generate an AC voltage from the coil 332. Since the shaft 304 comprises the iron core 304b formed with alternate notches and projections, the magnetic path formed by the iron pieces 302 and 302' is opened and closed in accordance with the movement of the shaft 304. As a result, the magnetic flux through the coil 332 changes with time thereby producing a voltage of a frequency proportional to the velocity of the movement of the shaft 304, i.e., a voltage approximately proportional to the velocity of the movement of the shaft 304.

Referring to FIG. 5 showing an exemplary method of digitalizing the indicated value of the odometer 1000, assuming that the drum 1' is now indicating 2, then the signals $D_1$, $D_2$, ..., and M from the contactors 3 which select 0010 representing the binary-coded decimal number 2 on the metallic foil 2 are supplied as a mileage signal 11 to the recording unit 200. The signal M is provided to indicate that the selected binary-coded decimal code pattern on each of the drums 1, 1', ..., represents the significant code elements and not the transient values from one number to the other. In order to produce such signals, those portions of the patterns on the drums 1, 1', ..., over which the contactors for producing the signals M slide, are printed with metallic foils which are located in the vicinity of the center of the areas in which the binary-coded decimal numbers are detected, so that current is conducted between these metallic foils and the contactors associated with the signals M.

We claim:

1. A recording system for a vehicle occupant protecting apparatus comprising:
   a collision sensor for detecting a collision of the vehicle to produce a collision signal;
   an occupant protecting apparatus ignition circuit connected to said collision sensor for receiving said collision signal to actuate, in response thereto, said occupant protecting apparatus;

a diagnostic circuit connected to said collision sensor and said ignition circuit, said diagnostic circuit, being responsive to any of:

1. the occurrence of a fault in said collision sensor,
2. the occurrence of a fault in said ignition circuit, and
3. operation of said ignition circuit for actuating the occupant protecting apparatus, to produce a diagnostic signal;

driving condition indicating means for producing a signal indicative of a driving condition of said vehicle; and a recording circuit connected to said collision sensor, the diagnostic circuit and said driving condition indicating means, said recording circuit being responsive to the occurrence of the diagnostic signal to record said signal indicative of the driving condition and any collision signal produced by said collision sensor.

2. A recording system according to claim 1, wherein said driving condition indicating means is an odometer and said signal indicative of the driving condition represents mileage.

3. A recording system according to claim 1, further comprising warning means connected to said diagnostic circuit and operative in response to a fault in either of said collision sensor and said ignition circuit to produce a warning.

4. A recording system according to claim 1, wherein said recording circuit comprises:
   a. a generating circuit connected to said diagnostic circuit and responsive to said diagnostic signal to produce a control signal; and
   b. a memory connected to said generating circuit and operated by the control signal to record said signals indicative of the driving condition and produced by said collision sensor.

5. A recording system according to claim 2 wherein said recording circuit comprises:
   a. a generating cicuit connected to said diagnostic circuit and responsive to said diagnostic signal to produce a control signal;
   b. an A/D converter connected to said collision sensor for converting said collision signal into a digital signal; and
   c. a memory connected to said generating circuit, said A/D converter and said odometer, said memory being operated by the control signal to record said digital signal and said signal representing mileage.

6. A recording system for a vehicle according to claim 1, wherein said collision sensor comprises:
   a coil, a magnet mounted on a magnetic stator means together with said coil, and a shaft movable through said coil in response to a collision, said shaft being made of magnetic material formed with a plurality of alternating notches and projections, wherein the movement of said shaft causes a plurality of potential changes across said coil during a time interval between the beginning and the end of said collision of the vehicle.

7. A recording system according to claim 3, wherein said collision sensor includes a first coil and a magnet mounted adjacent thereto so that relative movement therebetween resulting from a collision produces said collision signal and wherein said ignition circuit includes a second coil, the system further comprising:
   protective switch means connected between an electrical source and said first and second coils for supplying current thereto and opening whenever the current through said switch is greater than a predetermined value, said warning means including a lamp connected in parallel with said protective switch for illumination when said switch is open; and
   electronic switch means connected between said first and second coils and said protective switch means for conducting current greater than said predetermined value through the protective switch, in response to a break of either of said coils, to cause said protective switch means to open and said lamp to light.

8. A system according to claim 7, wherein said protective switch means is a fuse.

9. A system according to claim 7 wherein said electronic switch means includes an SCR.